(12) United States Patent
Assenbaum et al.

(10) Patent No.: US 9,940,833 B2
(45) Date of Patent: Apr. 10, 2018

(54) METHOD AND SYSTEM FOR LANE-ACCURATE DETERMINATION OF THE TRAVEL DIRECTION OF A VEHICLE AND OUTPUTTING WARNING MESSAGES IN THE CASE OF WRONG-WAY TRAVEL

(71) Applicant: DEUTSCHE TELEKOM AG, Bonn (DE)

(72) Inventors: Hans-Joerg Assenbaum, Guetersloh (DE); Thorsten Sinning, Aachen (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 15/001,406

(22) Filed: Jan. 20, 2016

(65) Prior Publication Data
US 2016/0210856 A1     Jul. 21, 2016

(30) Foreign Application Priority Data

Jan. 20, 2015   (DE) ........................ 10 2015 100 748

(51) Int. Cl.
| H04W 24/00 | (2009.01) |
| G08G 1/056 | (2006.01) |
| G01S 1/68 | (2006.01) |
| G08G 1/01 | (2006.01) |
| G08G 1/0967 | (2006.01) |
| G08G 1/16 | (2006.01) |
| H04W 4/00 | (2018.01) |

(Continued)

(52) U.S. Cl.
CPC ............... *G08G 1/056* (2013.01); *G01S 1/68* (2013.01); *G01S 5/02* (2013.01); *G08G 1/0116* (2013.01); *G08G 1/096716* (2013.01); *G08G 1/096758* (2013.01); *G08G 1/096783* (2013.01); *G08G 1/164* (2013.01); *H04W 4/008* (2013.01); *H04W 4/027* (2013.01); *H04W 88/02* (2013.01)

(58) Field of Classification Search
CPC ................. G08G 1/056; G08G 1/0116; G08G 1/096716; G08G 1/096758; G08G 1/096783; G08G 1/164; G01S 1/68; H04W 4/008; H04W 4/027; H04W 88/02
See application file for complete search history.

(56) References Cited

U.S. PATENT DOCUMENTS

| 8,917,188 B2 | 12/2014 | Wietfeld et al. |
| 2003/0152047 A1 | 8/2003 | Alger |

(Continued)

FOREIGN PATENT DOCUMENTS

| AT | 8795 U1 | 12/2006 |
| BE | 1010019 A6 | 11/1997 |

(Continued)

*Primary Examiner* — Barry Taylor
(74) *Attorney, Agent, or Firm* — Laurence A. Greenberg; Werner H. Stemer; Ralph E. Locher (57) ABSTRACT

A method for detecting the direction of travel of and for determining travel in the wrong direction by a vehicle which is moving on a lane in a section of road. Identifiers are respectively emitted by an arrangement of radio beacons which are arranged along the lane. When the vehicle travels through the section of road, a radio receiver, in particular a cell phone device, which is arranged in the vehicle, successively receives the emitted identifiers of the radio beacons. The actual direction of travel of the vehicle is determined on the basis of the sequence of the successively received identifiers.

8 Claims, 6 Drawing Sheets

(51) Int. Cl.
*H04W 4/02* (2018.01)
*G01S 5/02* (2010.01)
*H04W 88/02* (2009.01)

(56) References Cited

U.S. PATENT DOCUMENTS

| | | | | |
|---|---|---|---|---|
| 2012/0290150 | A1* | 11/2012 | Doughty | G08G 1/0116 |
| | | | | 701/2 |
| 2013/0234892 | A1 | 9/2013 | Povolny et al. | |
| 2014/0066091 | A1* | 3/2014 | Varoglu | G01S 19/10 |
| | | | | 455/456.1 |
| 2016/0029224 | A1* | 1/2016 | Edge | G01S 5/0252 |
| | | | | 455/456.1 |
| 2016/0077189 | A1* | 3/2016 | Elias | G01S 5/0263 |
| | | | | 455/456.6 |
| 2016/0192140 | A1* | 6/2016 | Park | H04W 40/244 |
| | | | | 455/456.3 |

FOREIGN PATENT DOCUMENTS

| | | |
|---|---|---|
| DE | 4244393 C1 | 3/1994 |
| DE | 19800692 A1 | 7/1999 |
| DE | 10032800 A1 | 1/2002 |
| DE | 10126548 A1 | 12/2002 |
| DE | 202005001123 U1 | 6/2005 |
| DE | 102010025379 A1 | 12/2011 |
| DE | 202013005510 U1 | 7/2013 |
| EP | 2637143 A1 | 9/2013 |

* cited by examiner

METHOD AND SYSTEM FOR LANE-ACCURATE DETERMINATION OF THE TRAVEL DIRECTION OF A VEHICLE AND OUTPUTTING WARNING MESSAGES IN THE CASE OF WRONG-WAY TRAVEL

CROSS-REFERENCE TO RELATED APPLICATION

This application claims the priority, under 35 U.S.C. § 119, of German patent application DE 10 2015 100 748.7, filed Jan. 20, 2015; the prior application is herewith incorporated by reference in its entirety.

BACKGROUND OF THE INVENTION

Field of the Invention

The present invention relates to the field of telemetry, in particular to the verification of the direction of travel of vehicles on highway entrances or directional roadways.

U.S. Pat. No. 8,917,188 B2 and its counterpart German patent application DE 10 201 0 025 379 A1 describe a method for determining and warning about drivers driving in the wrong direction as well as a signaling and warning system for drivers driving in the wrong direction. Beacons which emit radio fields are provided on sections of roadway. When the section of roadway is traveled through, shadows occur at regular repeating intervals and their sequence is determined and evaluated. Comparison of the sequence of the shadows with a stored pattern yields information about the direction of travel of the vehicle. If the driver is driving in the wrong direction, a warning signal is triggered.

Previous methods for detecting drivers driving in the wrong direction, such as the one above, require special installed devices onboard a car as well as beacons at the edge of the road. A sufficient probability of a hit with respect to a driver driving in the wrong direction is provided only if these devices are installed in a large number of cars. It therefore cannot be assumed that such systems are ready for use with coverage over a large area.

SUMMARY OF THE INVENTION

It is accordingly an object of the invention to provide a method and a system which overcome the above-mentioned and other disadvantages of the heretofore-known devices and methods of this general type and which provide for as large a coverage area as possible to detect drivers driving in the wrong direction without having to have recourse to special devices installed in the vehicles.

With the foregoing and other objects in view there is provided, in accordance with the invention, a method for detecting the direction of travel of a vehicle and for determining whether the vehicle is traveling in the wrong direction. The method which comprises:

providing an arrangement of radio beacons along a lane in a section of a road;

emitting identifiers from the radio beacons that are arranged along the lane;

when the vehicle travels through the section of road, receiving with a radio receiver in the vehicle (e.g., cell phone, smart phone), the emitted identifiers of the radio beacons in succession; and determining an actual direction of travel of the vehicle based a sequence of the successively received identifiers.

The sequence of the successively received identifiers may be compared with a stored sequential sequence, to thereby determine a direction of travel of the vehicle.

In other words, the present invention describes a radio beacon arrangement in public radio bands which can be received, in particular, by all common cell phone devices and permits the unambiguous assignment of the lane and of the direction of travel of cell phone receivers carried along in the car on the basis of the spatial arrangement of said cell phone devices and on the basis of radio beacon identifiers such as, preferably, numerical encoding of the emitted identifiers.

The main concept of the invention is to utilize the widespread distribution of cell phone devices to detect dangers posed by drivers driving in the wrong direction. In addition, a main concept of the invention is to produce, by means of skillful arrangement of radio beacons, certain pattern sequences which permit, through the systematic evaluation of telemetry data, roadway-accurate and reliable detection of travel by the vehicle in an inadmissible direction of travel, and furthermore make it possible to warn other road users about dangers in real time and with large area coverage. This solves the longstanding problem of the detection of drivers driving in the wrong direction. Travel in the wrong direction occurs when car drivers drive onto a freeway, or turn on the freeway, in the wrong direction of travel, either intentionally or inadvertently. Since a large number of drivers of cars also carry cell phone devices with them, drivers driving in the wrong direction can be detected. With the exception of the arrangement of the radio beacons, the system is not tied to a particular country or region either because cell phone devices are distributed throughout the world and the access to data is also available throughout the world by roaming.

The invention is also made advantageous by virtue of the fact that radio beacons are commercially available economically and with little expenditure. Solar-operated or battery-operated radio beacons are commercially available at low unit prices and can easily be mounted on existing reflector posts or crash barriers of long-distance roads. The core concept therefore comprises essentially the spatial arrangement of radio beacons, the detection and adjustment of sequences, access over a large coverage area and the use of the capabilities of the telemetry of cell phone devices. In addition, other data such as the quality of the roadway, acoustic data or video data can also be used to ensure the plausibility of registered data.

According to the invention, the emitted identifiers of the radio beacons are then successively received by the radio receiver in the vehicle during travel and are stored as a received sequence in the radio receiver. The actual direction of travel can then be determined on the basis of this received sequence.

For this purpose, this received sequence is preferably compared with a stored sequential sequence (pattern sequence). This pattern sequence can represent the local sequence of the radio beacons along the predefined direction of travel. If these two sequences correspond, the vehicle is travelling in the predefined direction of travel. Otherwise, travel in the wrong direction is occurring. For the storage of the pattern sequence it is not necessary for the associated identifiers to be explicitly stored in a memory; instead it is sufficient if the pattern sequence is stored in the form of an algorithm (formation rule) for the production of a series of explicit identifiers.

The systematics of the formation rule of the pattern sequence are preferably to be selected such that said pattern sequence is suitable for inferring that a vehicle is being driven in the wrong direction on the basis of the compliance with the systematics or the systematic deviation from the pattern sequence.

An embodiment such systematics is an orthogonal formation rule for the code sequence of the reception sequence for the expected direction of travel and the opposite direction of movement is to be established because there is a high probability that the vehicles on a road move in two opposite directions of travel only, and deviations can be ruled out.

Devices which are permanently installed in the vehicle can also be considered as radio receivers or as a cell phone device, said devices being configured, in particular, for the reception of cell phone signals and signals of short-range radio.

In addition, it is preferably possible to differentiate between different types of identifiers. The identifiers of a different type are assigned to different predefined sets of identifiers which have, in particular, no intersecting sets with one another. It is therefore possible for the identifiers to exhibit, for example through different parities (identifiers are composed of even or odd numerical values), different types of character (for example identifiers are composed exclusively of letters or numbers), or membership of different, predetermined mathematically defined sets (for example numerical values of the identifiers are greater than or less than a specific value).

The system for implementing the method comprises a multiplicity of radio beacons which each emit an, in particular uniquely defined identifier in short-range radio. The transmission areas of at least two radio beacons which are located at different longitudinal positions along the section of road or which are assigned to a common pattern sequence must not overlap here. Consequently, when considered in the prescribed direction of travel these transmission areas have to be arranged one behind the other.

It is preferred that all the radio beacons which are arranged on one side of a lane emit identifiers of a first type of identifier, and all the radio beacons which are arranged on another side of a lane emit identifiers of a second type of identifier. The determination of the direction of travel can be verified by possible detection of the side of the vehicle on which the respective identifiers are emitted.

It is also preferred that a long-range cellular radio in the region of the section of road emits a signal which initiates activation of the reception of the identifiers in a cell phone device. As a result, this reception can also be switched off again when the section of road is exited. By means of this signal it is consequently possible to activate or deactivate the determination of the direction of travel. In this context, the less energy-intensive possibilities of cell phone radio are consequently used for rough determination of positions, in order to detect that the vehicle is located spatially in the region of the system for detecting the direction of travel. The more costly determination of the direction of travel is not switched on until then.

Other features which are considered as characteristic for the invention are set forth in the appended claims.

Although the invention is illustrated and described herein as embodied in a method and system for lane-accurate determination of the direction of vehicles on lanes and outputting of warning messages in the case of travel in the wrong direction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
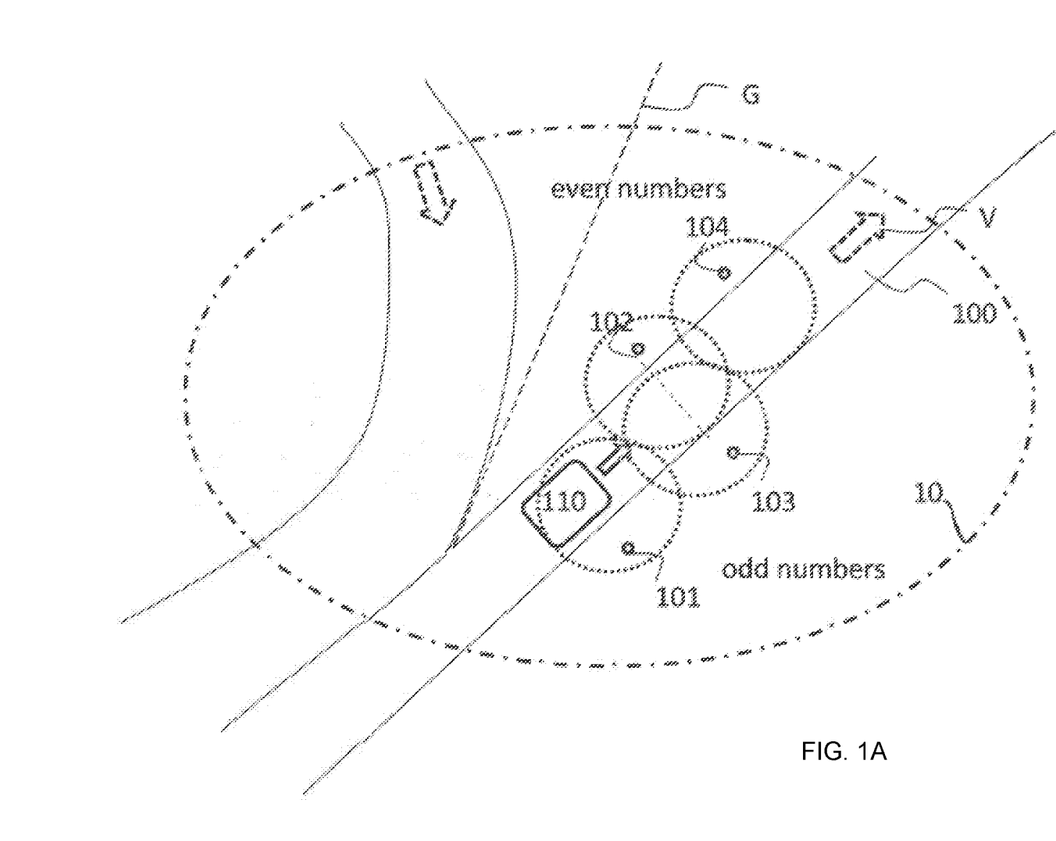
FIG. 1A shows a highway entrance with separate lanes and a sketch of the system according to the invention and of a vehicle which is driving in the prescribed direction of travel.

Referring now to the figures of the drawing in detail and first, particularly, to FIG. 1A thereof, there is shown a system for implementing the method according to the invention. The novel system comprises an arrangement of radio beacons with two radio beacons 101, 103 at the right-hand edge of the lane of a highway entrance 100 and two radio beacons 102, 104 at the left-hand edge of the lane of the highway entrance 100, also referred to as an entry ramp 100. The highway entrance 100 constitutes a section of road. The radio beacons 102 and 103 are substantially opposite one another on the left-hand and right-hand sides of the lane, relative to the direction of travel, and are therefore arranged in a common longitudinal position of the section of road. The transmission areas of the two radio beacons 102, 103 overlap. The transmission areas of the radio beacons 101 and 104 which are at the largest distance from one another and are also arranged at different longitudinal positions (that is to say one after the other considered in the direction of travel) of the section of road do not overlap. The transmission areas are represented by dashed circles around the radio beacons; the transmission areas are defined by the maximum (if appropriate direction-dependent) transmission range.

The radio beacons 101 and 103 at the right-hand edge of the lane essentially emit an identifier with odd-numbered code symbols. The code symbols are, for example, odd numbers "101" and "103", and the radio beacons on the left-hand side 102 and 104 emit code symbols with even numbers "102" and "104".

The vehicle 110 is carrying a cell phone device, or a smart phone. After the vehicle drives into the transmission range of a cell phone cell 10, a command to switch on short-range radio reception is issued to the cell phone by way of a signal of the long-range radio network. A pattern sequence of code symbols of radio beacons of the short-range radio reception is transmitted by means of long-range radio to the cell phone for storage in the cell phone. The cell phone then scans the short-range radio for identifiers of radio beacons. When the vehicle drives into the transmission area of the radio beacon 101, the cell phone receives the identifier of the radio beacon 101. If the car drives further along the road, the identifiers of the next two radio beacons 102 and 103 are received. The vehicle exits the transmission area of the first radio beacon 101 and then receives the identifier of the radio beacon 104. The vehicle then exits the transmission area of the radio beacons 102 and 103 and subsequently the transmission area of the radio beacon 104.

The sequence of the received identifiers, that is to say the list of identifiers in the received order, is stored successively in the memory of the cell phone device. Either the received sequence 101, 102, 103, 104 or alternatively the received sequence 101, 103, 102, 104 is then stored in the memory. This received sequence is then compared with the anticipated stored pattern sequences. If the two sequences correspond, the vehicle is being driven along the highway entrance 100 in the prescribed direction V of travel. Otherwise, a signal is triggered and a warning is passed on via the long-range radio. When the vehicle 110 exits the cell phone cell 10, the short-range radio reception in the cell phone device is switched off.

The spatial distance between the radio beacons is selected such that the smallest possible overlap of the transmission areas occurs. This is achieved by virtue of the fact that the radio beacons are arranged at least partially in different longitudinal positions or the antennas have a distinctive directional effect.

In simplified terms, a fixed pattern sequence can be agreed if the same spatial arrangement of the radio beacons is installed. For example, it can be agreed that a valid pattern sequence is essentially a first element of a code symbol of a first type, and all the subsequent code symbols of the first type have increasing values.

Specifically, the first symbol can be a "101" as the pattern sequence for the prescribed direction of travel, and the pattern sequence also comprises the symbols "103" and "105" if the vehicle drives along the highway entrance in the prescribed direction of travel. If the vehicle 110 is moving counter to the prescribed direction V of travel, the sequence is composed of a decreasing series of code symbols, and the first code symbol is the highest of the sequence, and in this example the first symbol is therefore the identifier "105", and the following identifiers are then "103", "101". The identifiers "101" and "105" must not occur simultaneously here, in order to avoid mix-ups. This can be achieved by avoiding the overlapping of transmission areas of the radio beacons.

In addition, the identifiers of the radio beacons with identifiers of the first type are to be arranged on the respective right-hand side of the predefined direction V of travel, and identifiers of a second type are to be provided in radio beacons on the left-hand side of the predefined direction of travel. It is therefore possible to achieve additional plausibility of the actual direction R of travel and the predefined direction V of travel by means of a directional effect of the short-range reception. In the present case, the two different types of identifiers are each defined by different parities (even/odd).

As a rule, these radio beacons can be mechanically fastened to the reflective posts of the highway entrance after the setting of the transmission area and of the transmission power. Such radio beacons are operated in the frequency range which is provided for communication with Bluetooth, Bluetooth LE, NEC, SRD or ISM radio or WLAN. These standards are also present in most cell phones.

Figure 1B:
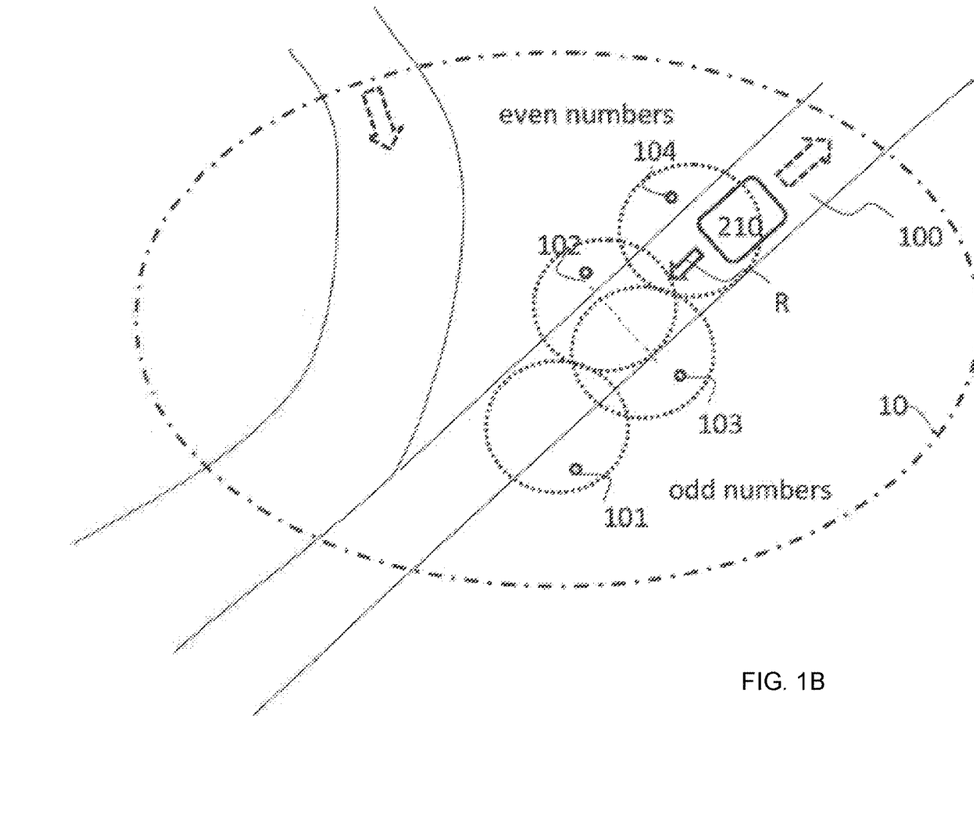
FIG. 1B shows a highway entrance with separate lanes and a sketch of the system according to the invention and of a vehicle which is driving in the opposite direction to the prescribed direction of travel.

Referring now to FIG. 1B, there is shown a vehicle 210 that is moving counter to the prescribed direction V of travel. The prescribed direction of travel is represented here by a dashed directional arrow V on the lane of the highway entrance 200.

The vehicle 210 is also carrying a cell phone device. After the vehicle drives onto the highway entrance 200, it enters the transmission range of the cell phone cell 10. A command to switch on the short-range radio reception is issued to the cell phone by means of a signal of the long-range radio network. A pattern sequence of anticipated identifiers of the short-range radio reception is transmitted by means of the long-range radio to the cell phone for storage in the cell phone. This pattern sequence corresponds to the pattern sequence which was transmitted to the vehicle 110 in accordance with the description in FIG. 1*a*. The cell phone then scans the short-range radio for identifiers of radio beacons in the surroundings to around 20 meters around its location. When the vehicle drives into the transmission area of the radio beacon 104, the cell phone receives the identifier "104" of the radio beacon 104. If the vehicle then continues to drive along the road, the identifiers "102" and "103" of the next two radio beacons "102" and "103" are received. The vehicle exits the transmission area of the radio beacon 104 and then receives the identifier "101" of the radio beacon 101. The vehicle then exits the transmission areas of the radio beacons 102 and 103 and subsequently the transmission area of the radio beacon 101.

The sequence of the received identifiers is then either the sequence 104, 102, 103, 101 or alternatively the sequence 104, 103, 102, 101. This received sequence is then compared with the anticipated and stored pattern sequence of the identifiers. Since the received sequence does not correspond to one of the stored pattern sequences, it is detected that the vehicle is moving counter to the prescribed direction of travel. A warning signal is triggered and a warning is passed on via the long-range radio. When the vehicle 110 then exits the cell phone cell 10, the short-range radio reception in the cell phone device is switched off, in order thereby to save energy in the cell phone device and use the battery time effectively.

Alternatively, a list of cell phone cell identifiers at which the short-range radio reception is activated can also be stored when the application is installed on the cell phone device. The list can be updated at any time by exchanging information with the Internet and/or by means of contact with the cell phone network in a wireless "over the air" (OTA) fashion, in particular in the case of roaming when the vehicle moves into different supply areas or countries. The data are written in the form of a lookup table into a memory area of the cell phone and compared with the cell identifiers of the cell phone cell 10 into which the cell phone is logged. Alternatively, local WiFi or WLAN networks can also be used at the measuring points, the identifier of which networks is stored. In the case of an alarm, a warning can also be transmitted to the long-range radio network by means of a text message, for example an SMS, to the cell phone network. The text message is then passed on by the short message service center in the cell phone network to a server for the evaluation of the warning messages. The warning can also be passed on by WiFi and by email or an instant message service. The technology can therefore be used worldwide irrespective of the cell phone network.

Figure 1C:
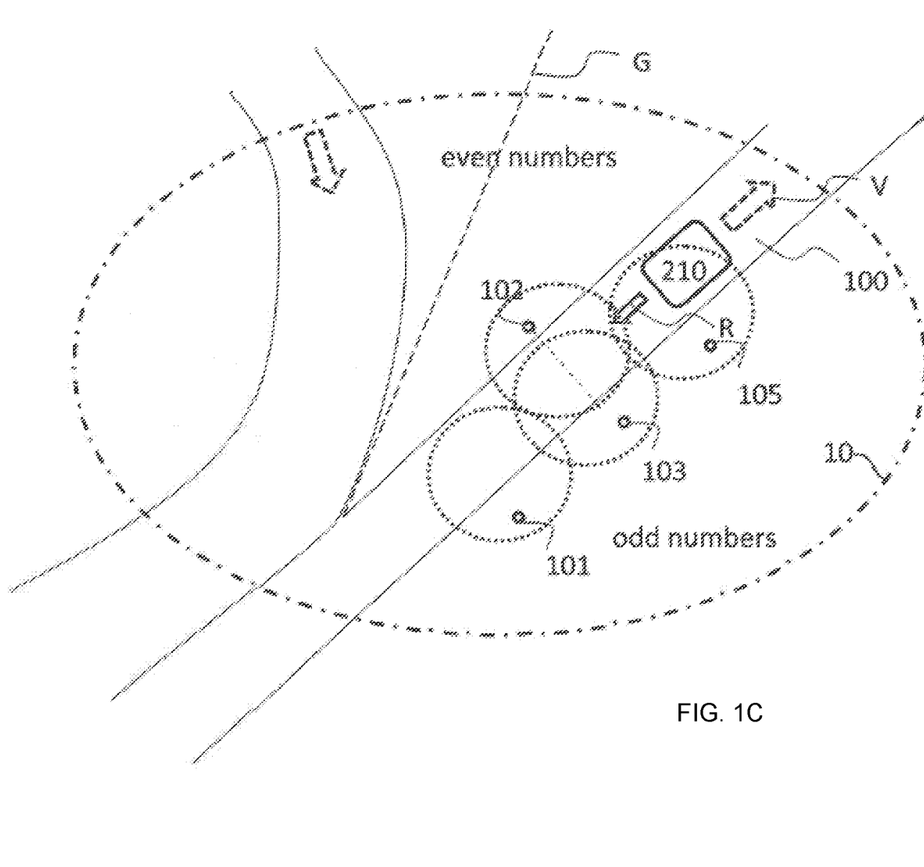
FIG. 1C shows a highway entrance with separate lanes and a sketch of a refinement of the system according to the invention and of a vehicle which is driving in the opposite direction to the prescribed direction of travel.

As illustrated in FIG. 1C, other arrangements of the radio beacons are also conceivable if alternative pattern sequences corresponding to the anticipated series of receivable identifiers are stored.

Figure 2:
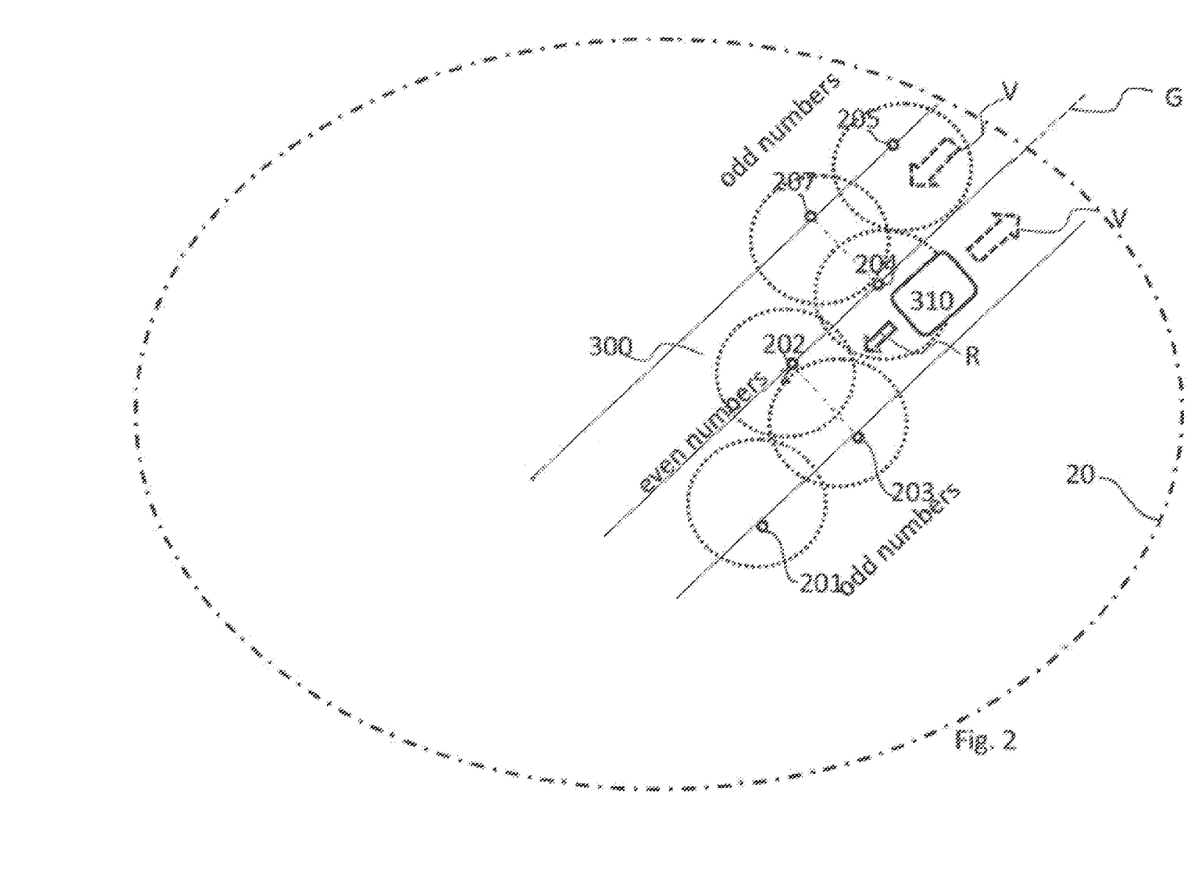
FIG. 2 shows a freeway with two directional lanes and a sketch of the system according to the invention and of a vehicle which is driving in the opposite direction to the prescribed direction of travel.

Referring now to FIG. 2, there is shown a system for implementing a method according to the invention for the section 300 of a main road, the system being largely based on the method described above with reference to FIGS. 1A-1C. The road section comprises a roadway with one lane per direction of travel. The arrangement of the radio beacons comprises six radio beacons, two radio beacons on the right-hand 201, 203 edge of the roadway of the main road 300, two radio beacons 202, 204 on the lane boundary, either mounted on the median strip or embedded into the road surface, and two radio beacons 207, 205 on the left-hand edge of the roadway of the main road. The radio beacons 202 and 203 and 204 and 207 are located essentially opposite one another at the edges of the lanes, and the transmission areas of the radio beacons can overlap, with the exception of the transmission areas of the radio beacons 201 and 205. The radio beacons 201, 203 and 205, 207 at the edges of the roadway essentially emit an identifier of the first type, for example with odd-numbered code symbols. The code symbols are, for example, the odd numbers "201", "203" and "205", "207" and the radio beacons in the center 202 and 204 emit identifiers of the second type, for example the even numbers "202" and "204".

The vehicle 310 is carrying a cell phone device. After the vehicle drives onto the main road 300, it enters the transmission range of the cell phone cell 20, but the vehicle (direction R of travel) is moving in the opposite direction to the prescribed direction V of travel of the lane on which it is located. A command to switch on the short-range radio reception is issued to the cell phone by means of a signal of the long-range radio network. A pattern sequence of anticipated code symbols of the short-range radio reception of the radio beacons is transmitted to the cell phone by means of the long-range radio. The cell phone then scans the short-range radio for identifiers of radio beacons in the surroundings to around 20 meters. When the vehicle drives into the transmission area of the radio beacon 204, the cell phone receives the identifier of the radio beacon 204. If the car drives further along the course of the road, the identifiers of the next two radio beacons 202 and 203 are received. The vehicle exits the transmission area of the radio beacon 204, and then receives the identifier of the radio beacon 201. The vehicle then exits the transmission areas of the radio beacons 202 and 203 and subsequently the transmission area of the radio beacon 201.

It is to be emphasized here that the transmission ranges of the radio beacons (odd-numbered identifiers) which are arranged at the edge of the roadway do not respectively transgress the direction of travel boundary G, that is to say the boundary between two lanes, each with different predefined directions of travel. In the present case, the center of the roadway (boundary of the two lanes) represents the direction of travel boundary G. Otherwise, the vehicle 310 could nevertheless detect the identifier "205", which leads to an incorrect evaluation. The direction of travel boundary G is then considered to be transgressed if the transmission range of a radio beacon projects into two lanes, each with opposite predefined directions V of travel.

The sequence of the received identifiers in the memory of the cell phone is then either the sequence 204, 202, 203, 201 or alternatively the sequence 204, 203, 202, 201. The received sequence is then compared with the anticipated stored pattern sequences of the identifiers. If the sequences correspond, the vehicle is being driven along the highway entrance in the prescribed direction of travel. Otherwise, a signal is triggered and a warning is passed on via the long-range radio. In this case, anticipated pattern sequences would be: 205, 207, 204, 202 or alternatively the pattern sequence 205, 204, 207, 202 for the direction of travel south-west, and the pattern sequence 201, 202, 203, 204 or alternatively the pattern sequence 101, 203, 202, 204 for the direction of travel north-east. None of the anticipated sequences was received. This is because the anticipated pattern sequence always starts with an odd-numbered code symbol as an identifier and values of the odd-numbered identifiers then increase sequentially.

In the present case, the received sequence starts with an even-numbered identifier, and the values of the odd-numbered identifiers are falling. Therefore, the received sequence is invalid, and the driver appears to be driving counter to the prescribed direction V of travel. If the vehicle 110 then exits the cell phone cell 20, the short-range radio reception in the cell phone device is switched off, in order thereby to save energy in the cell phone device and use the battery time effectively.

Figure 3:
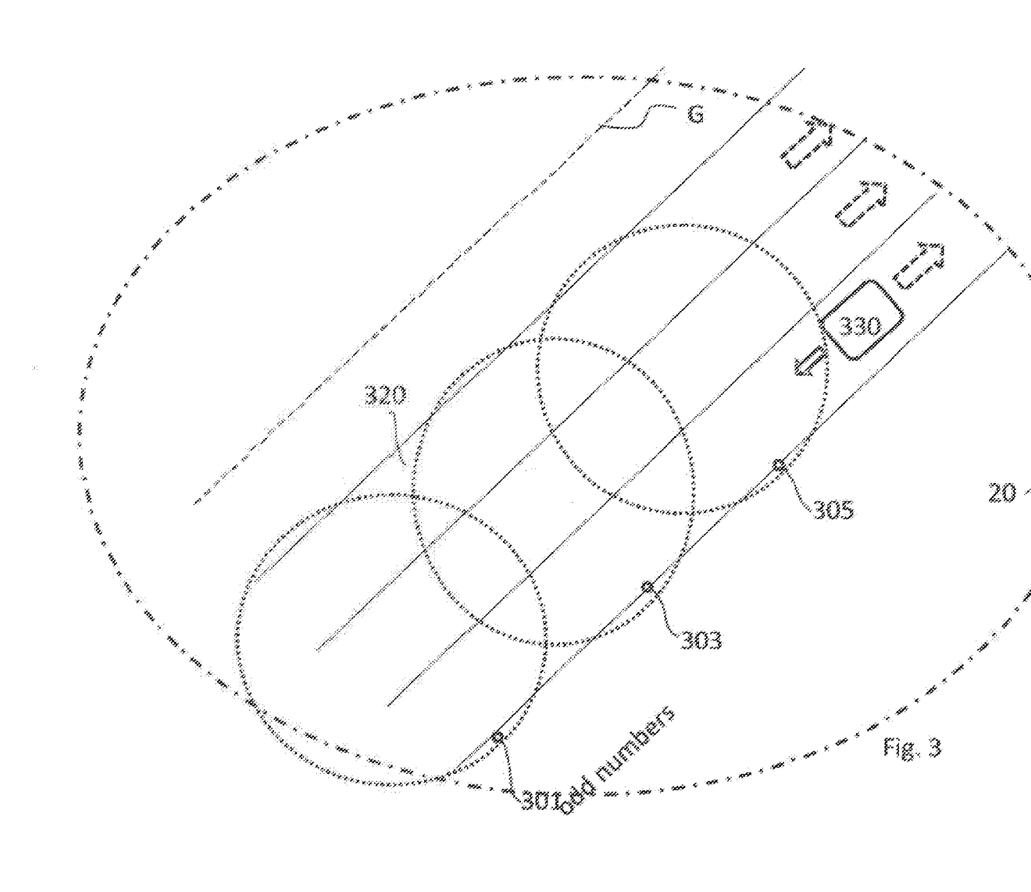
FIG. 3 shows a three-lane lane of a freeway and a sketch of a refinement of the system according to the invention and of a vehicle which is driving in the opposite direction to the prescribed direction of travel.

Referring now to FIG. 3, there is outlined a system for implementing the method according to the invention for a highway, or freeway, such as an interstate highway. The highway comprises in each case separate roadways 330 for each direction of travel with at least two, in the present case three, lanes per direction of travel. The arrangement of the radio beacons comprises three radio beacons 301, 303, 305 at the right-hand edge of the roadway. The transmission areas of the radio beacons 301 and 305 do not overlap. The radio beacons 301, 303 and 305 at the edge of the roadway essentially emit an identifier of the first type, for example with odd-numbered code symbols over all three lanes. The code symbols are, for example, the odd numbers "301", "303" and "305".

The vehicle 330 is in turn carrying a cell phone device. After the vehicle drives onto the roadway counter to the prescribed direction V of travel, it enters the transmission range of the cell phone cell 20. A command to switch on the short-range radio reception is issued to the cell phone by means of a signal of the long-range radio network. Anticipated pattern sequences of code symbols of the short-range radio reception are transmitted to the cell phone by means of the long-range radio. The cell phone then scans the short-range radio for identifiers of radio beacons in the surroundings to approximately 20 meters. When the vehicle drives into the transmission area of the radio beacon 305, the cell phone receives the identifier of the radio beacon 305. If the car continues to drive along the course of the road, the identifiers of the next radio beacon 303 are received. The vehicle exits the transmission area of the radio beacon 303 and then receives the identifier of the radio beacon 301. Subsequently, the vehicle exits the transmission area of the radio beacon 301.

The sequence of the received identifiers in the memory of the cell phone is then the sequence 305, 303, 301. These sequences are then compared with the anticipated stored pattern sequences of the identifiers, that is to say here 301, 303, 305. The sequences do not correspond because although the stored sequence starts with an odd-numbered identifier, it is sequentially increasing. The vehicle is therefore driving counter to the in prescribed direction V of travel. A warning signal is triggered, and a warning is passed on via the long-range radio.

Here, transmission ranges of the radio beacons can actually overlap the individual lanes; there is no overlapping of the transmission ranges with the lanes (not illustrated) of the roadway for the opposite direction of travel. In this respect, the transmission ranges do not transgress the direction of travel boundary G here either.

Figure 4:
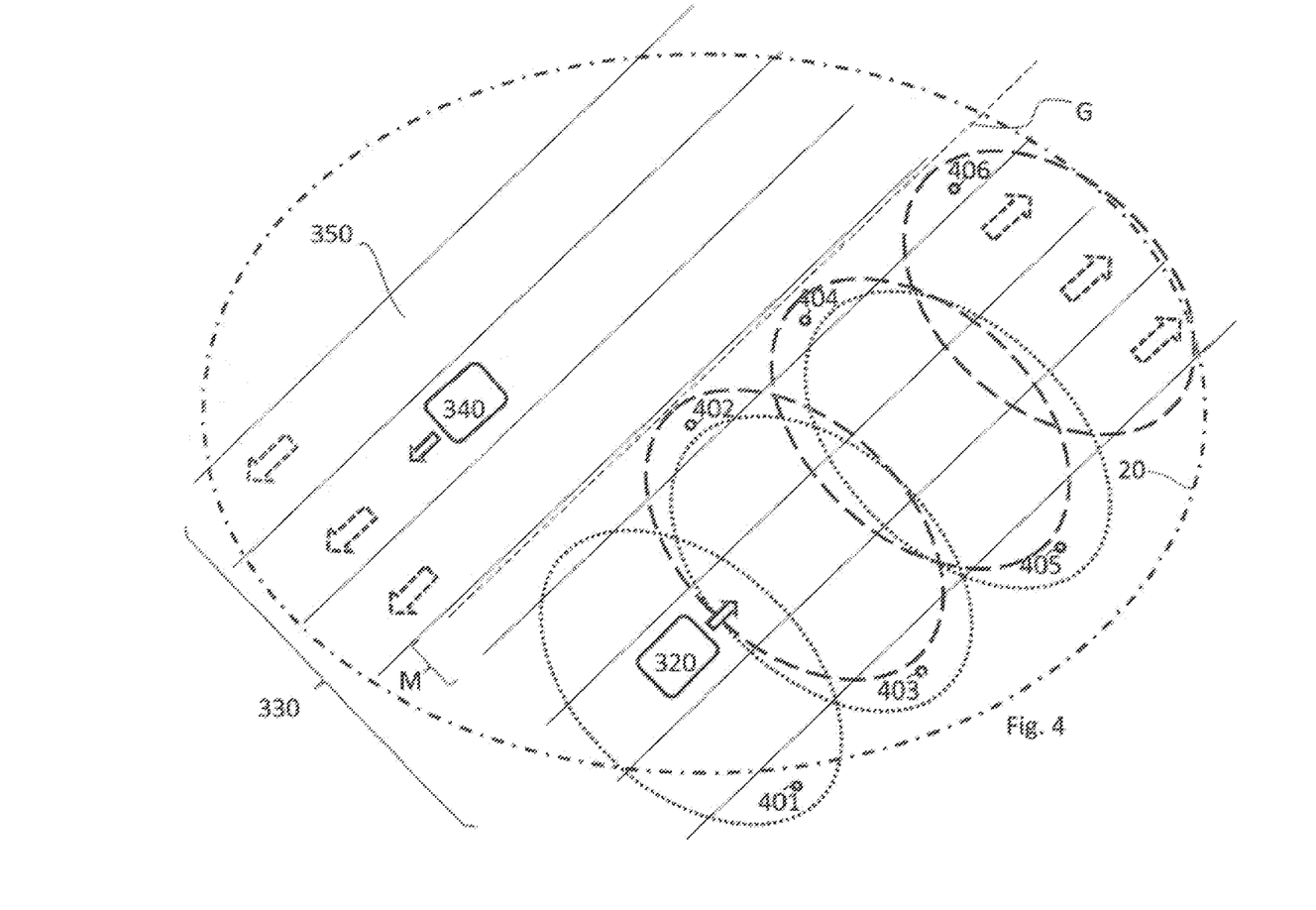
FIG. 4 shows a six-lane freeway and a sketch of a refinement of the system according to the invention and of a vehicle which is driving in the prescribed direction of travel.

Referring now to FIG. 4, there is shown a system for implementing the method according to the invention for a freeway 350. The freeway comprises a roadways 330 with at least two, in the present case three, lanes per direction of travel. The lanes of the one direction of travel are separated from the lanes of the other direction of travel by a median strip M. The arrangement of the radio beacons comprises six radio beacons. The transmission ranges do not overlap the direction of travel boundary G which is located in the region of the median strip M. Three radio beacons 401, 403, 405 are arranged at the right-hand edge of the roadway, and three radio beacons 402, 404, 406 are arranged at the median strip M. The radio beacons 402, 403 and 404, 405 are located essentially opposite one another, and the transmission areas for the radio beacons overlap, with the exception of the transmission areas of the radio beacons 401 and 405.

The radio beacons 401, 403 and 405 at the right-hand edge of the roadway essentially emit an identifier of the first type, for example with odd-numbered code symbols. The code symbols are, for example, the odd numbers "401", "403" and "405", and the radio beacons in the median strip 402, 404 and 406 emit an identifier of the second type, for example with even numbers "402," "404" and "406."

The vehicle 320 is carrying a cell phone device. After the vehicle drives onto the freeway, it enters the transmission range of the cell phone cell 20. The vehicle 330 is located on a lane in the prescribed direction V of travel. A command to switch on the short-range radio reception is issued to the cell phone by means of a signal of the long-range radio network. Anticipated pattern sequences of code symbols of the short-range radio reception are transmitted to the cell phone by means of the long-range radio and are stored there. The cell phone then scans the short-range radio for identifiers of radio beacons in the surroundings to approximately 20 meters. When the vehicle drives into the transmission areas of the radio beacon 401, the cell phone receives the identifier of the radio beacon 401. If the car 330 continues to drive along the course of the road, the identifiers of the next two radio beacons 402, 403 and 404, 405 and 406 are received.

The sequence of the received identifiers in the memory of the cell phone is now either the sequence 401, 402, 403, 404, 405 and 406 or alternatively the sequence 401, 403, 402, 405, 404, 406 or alternatively the sequence 401, 402, 403, 405, 404, 406 or as a further alternative the sequence 401, 402, 403, 404, 405, 406. These sequences are then compared with the anticipated stored pattern sequences of the code symbols. The sequences are respectively valid sequences in the sense of the use of the prescribed direction R of travel because the numerical value of the first identifier is odd, and the odd numerical values of the further identifiers are sequentially increasing. The vehicle is therefore being driven on the freeway in the prescribed direction V of travel. A signal for warning is therefore not passed on via the long-range radio.

A person skilled in the art can, on the basis of a specialist knowledge together with knowledge of this invention conceive further embodiments without departing from the core of the invention. It is therefore possible, for example, to use different codes which have similar properties such as even and odd numbers from the preceding examples. In particular orthogonal codes, to which values are to be assigned, are also possible.

In addition it is also possible that in a supporting fashion a process of locating the respective left-hand or right-hand boundary is carried out on the basis of first or second types of identifiers. This is conceivable in particular in the case of permanently installed systems such as, for example, a navigation system or telemetry systems in the car which are operated in a stationary fashion and which, in addition to the sequences, use the spatial radio location of the beacons and the assignment of the code to the left-hand or right-hand side of the edge of the roadway as plausibility criteria.

The invention claimed is:

1. A method for detecting the direction of travel of a vehicle and for determining whether the vehicle is traveling in the wrong direction, the method which comprises:
   providing an arrangement of radio beacons along a lane in a section of a road, wherein the radio beacons use short-range radio;
   emitting identifiers from the radio beacons that are arranged along the lane;
   when the vehicle travels through the section of road, receiving with a radio receiver of a cell phone device in the vehicle, the emitted identifiers of the radio beacons in succession
   activating the radio receiver by long-range data radio when the vehicle enters the section of the road; and
   determining an actual direction of travel of the vehicle based on the sequence in which the successively received identifiers are received;
   triggering a warning signal and passing the warning signal on via the long-range radio if the vehicle is moving counter to the prescribed direction of travel.

2. The method according to claim 1, which comprises comparing the sequence of the successively received identifiers with a stored sequential sequence, to thereby determine a direction of travel of the vehicle.

3. The method according to claim 1, wherein the radio beacons use short-range radio having a range that is shorter than a distance between the transmitting radio beacon and a direction of a travel boundary in the section of road.

4. The method according to claim 1, which comprises activating the radio receiver by a cell phone signal.

5. The method according to claim 1, wherein the long-range data radio has a range which is greater than a distance between the two radio beacons that are farthest away and whose identifiers are stored in a common sequential order.

6. The method according to claim 1, wherein a cell phone device receives a signal by way of a receiver for short-range radio, the receiver decodes the signals of the radio beacons disposed at the edge of the road, and determines that the cell phone device is moving in a direction of a prescribed direction of travel if the identifier of a first type is received as a first identifier of a radio beacon, and then a sequentially increasing series of identifiers and finally an identifier of the second type is received.

7. The method according to claim 1, wherein a valid pattern sequence is a first element of an identifier of the first type, and all subsequent identifiers of the first type having increasing values.

8. The method according to claim 1, which comprises determining, with the radio receiver, by radio location, whether the first type of identifier is to be assigned to the right-hand side of the roadway, and the second type of identifier is to be assigned to the left-hand side of the roadway.

\* \* \* \* \*